Nov. 29, 1960 A. L. THURSTON 2,962,275
PLATFORM WEIGHING APPARATUS
Filed July 19, 1957 4 Sheets-Sheet 1
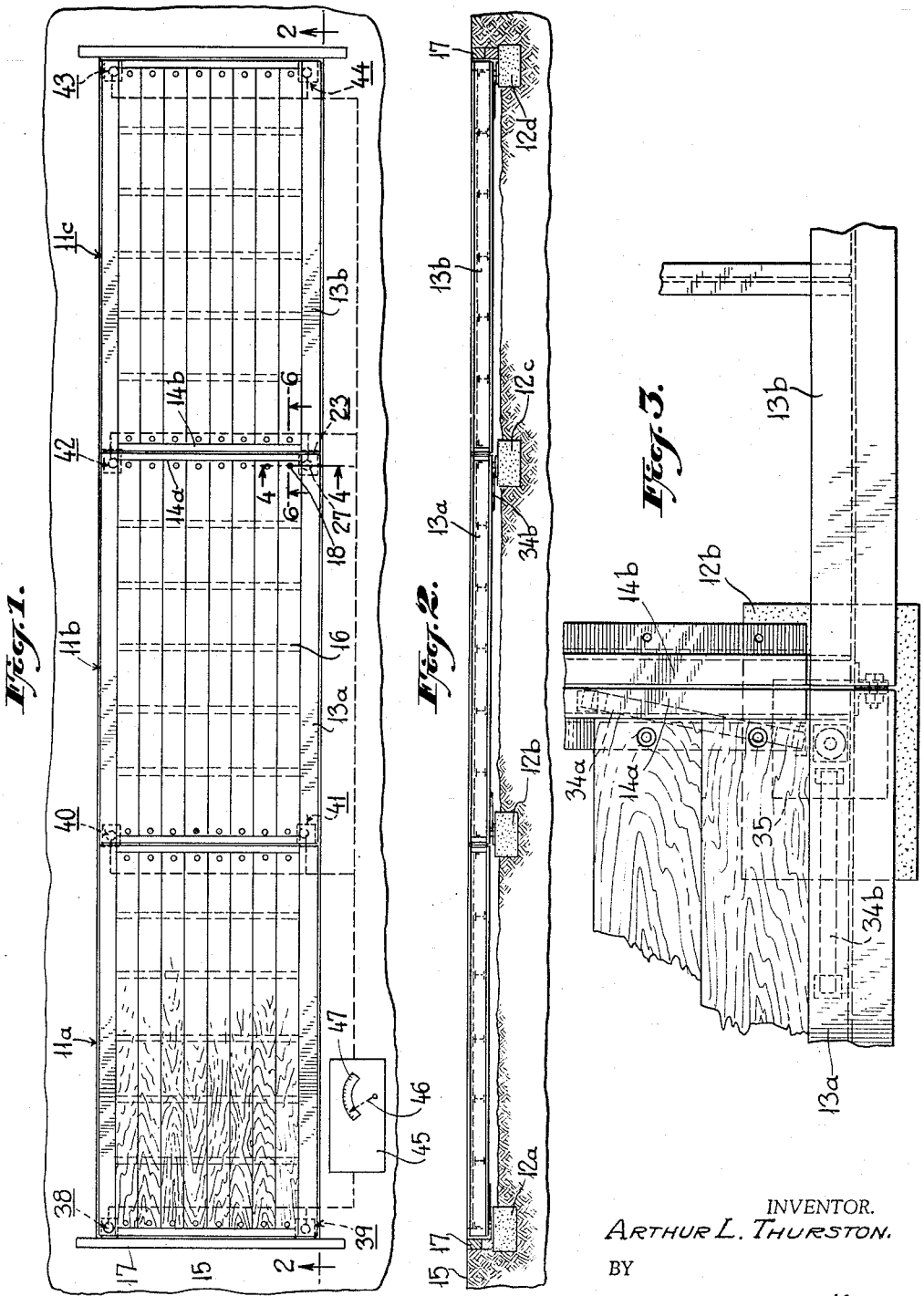
INVENTOR.
ARTHUR L. THURSTON.
BY
Ward, Neat, Haselton, Orme & McClannon
ATTORNEYS.

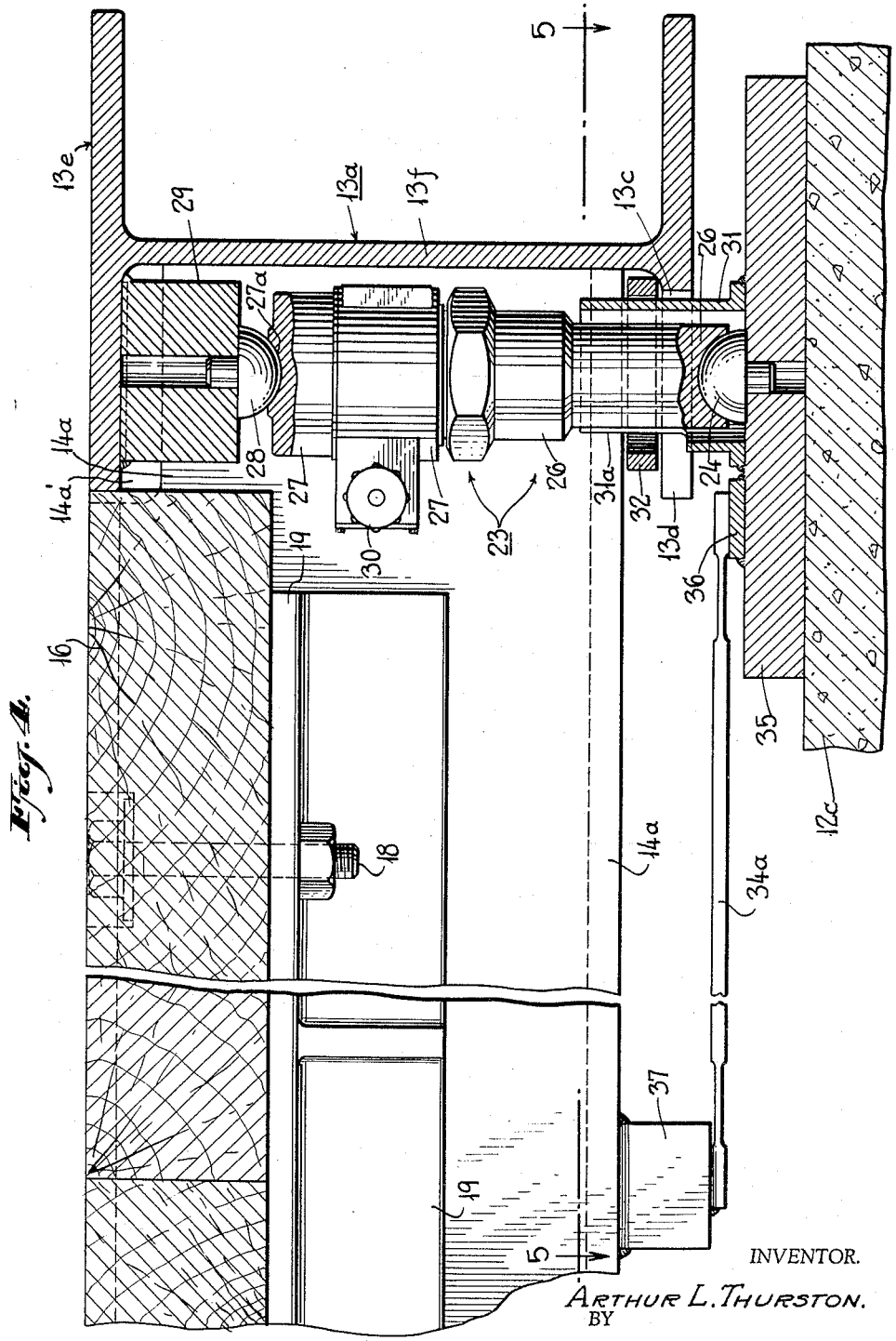
Nov. 29, 1960     A. L. THURSTON     2,962,275
PLATFORM WEIGHING APPARATUS
Filed July 19, 1957     4 Sheets-Sheet 2
INVENTOR.
ARTHUR L. THURSTON.
BY
Ward Neal Haselton Orme & McElhannon
ATTORNEYS.

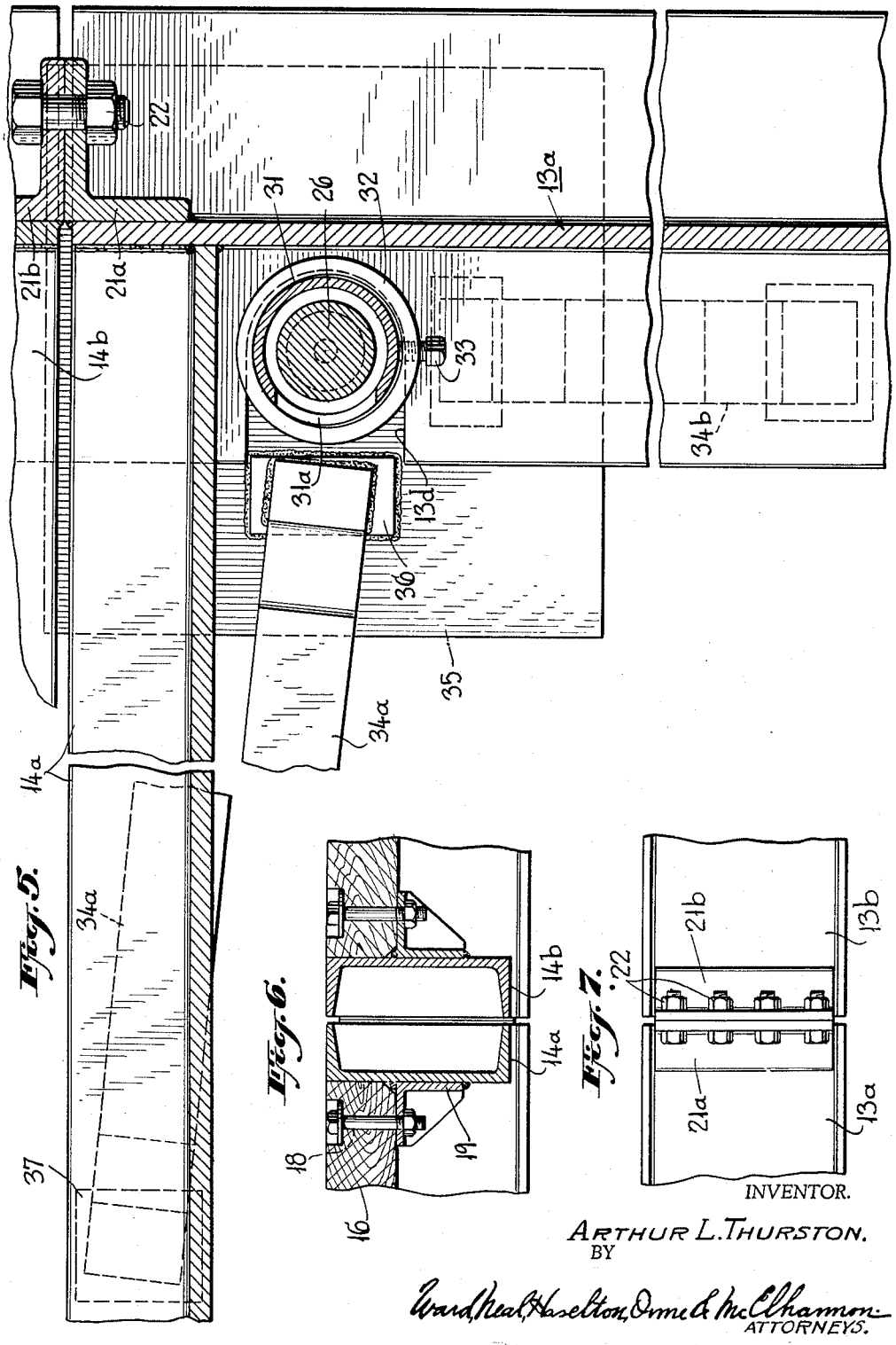

Nov. 29, 1960

A. L. THURSTON 2,962,275

PLATFORM WEIGHING APPARATUS

Filed July 19, 1957

INVENTOR.
ARTHUR L. THURSTON.
BY
*Ward, Neal, Haselton, Orme & McElhannon*
ATTORNEYS.

United States Patent Office 2,962,275
Patented Nov. 29, 1960

2,962,275

PLATFORM WEIGHING APPARATUS

Arthur L. Thurston, Cheshire, Conn., assignor to Revere Corporation of America, Wallingford, Conn., a corporation of New Jersey Filed July 19, 1957, Ser. No. 673,071

5 Claims. (Cl. 265—71)

This invention relates to weighing apparatus, and is particularly adaptable to vehicle weighing apparatus among other possible uses.

In one of its presently preferred forms, the invention may be embodied in platform scales designed for weighing trucks, cars, airplanes, etc. This invention is especially useful in the design of platform scales for weighing trucks on highways.

There is great demand for suitable apparatus for weighing vehicles, such as trucks. In order to prevent damage to highways, the governments of various jurisdictions have enacted laws which limit the weight or load allowable upon axles of vehicles, such as trucks, semi-trailers, trailers and the like, within their respective jurisdictions. Proper enforcement of such laws requires maintaining vehicle or truck weighing stations at selected locations on highways. Such inspection or weighing stations may usually be located upon an auxiliary lane which is parallel to the main highway and in which a platform scale or scales are placed. Previously available apparatus for this purpose has necessitated the use of relatively deep pits in order to accommodate the platform and weighing apparatus. Such deep pits have been needed because the construction of prior weighing apparatus has usually involved the use of heavy supporting beams. The devices used to measure the weight applied to such apparatus have of necessity been installed underneath the platform structure itself, thus adding substantially to the depth of the excavation required for housing the apparatus.

According to one aspect of this invention, weighing apparatus may be provided which comprises supporting base means, a superimposed platform structure, and a plurality of weighing cell assemblies located at spaced positions and adapted to support the platform structure with respect to the base means. The platform structure includes beam means having upper and lower superimposed, spaced, horizontal flanges and the weighing cell assemblies are located between the upper and lower flanges and extend to the base means through openings in the lower flange. In this way the weighing cell assemblies may be located mostly within the depth of the platform structure and need not extend more than a short distance below the lower flange of the beam. It is thus possible to construct platform scales which have an overall depth considerably less than the depth of previously available apparatus and hence do not require as deep or extensive an excavation in order to leave the top surface of the weighing platform level with the road or ground.

The weighing cell assemblies used in accordance with this invention may be of any suitable type, but preferably include one or more steel columns which may be used in conjunction with suitable electrical strain gages to measure the weight applied to the weighing platform. Weighing cells of the type described in my U.S. Patent 2,488,349 may be used in such weighing assemblies. The weighing cell assembly may include any suitable means for transmitting weight from the top flange of the beam through the weighing cell itself to the base means. The opening or hole in the lower flange through which the weighing cell assembly extends allows the total weight to be transmitted through the weighing cell so that while the weighing assemblies are in position the entire weight of the platform including the applied weight is transmitted through the weighing assemblies rather than through the beam.

The opening in the lower flange of the beam means preferably comprises a transverse slot extending to the edge of the flange and adapted to allow separation of the weighing cell assembly from the beam means by transverse movement through the slot.

In the form of the invention in which the opening in the lower flange of the beam means is of the preferred type described above, it is within the scope of this invention to provide means for preventing removal of the weighing cell assembly from the lower flange of the beam means when such removal is not desired. Such means preferably comprises a generally cylindrical open-ended cover fastened to the base means and projecting upward through the slot in the lower flange of the beam means. This cover has a longitudinal slot adapted to cooperate with the slot in the lower flange in allowing the weighing cell assembly to be removed. A lock ring is also provided which can be secured around the protective cover in such a way as to prevent removal of the weighing cell assembly. When such removal is desired, the lock ring can be moved up off the protective cover while remaining around the weighing cell assembly. Suitable means such as a set screw may be provided to fasten the lock ring in the desired positions.

In one embodiment of this invention, the beam means comprises one or more I-beams which form an integral part of the platform structure. The upper flange of the I-beam may conveniently form the outer edge of the upper surface of the weighing platform and the I-beam itself may conveniently serve as one of the principal supporting members in the platform structure. The opening or hole in the bottom flange of the I-beam through which the weighing assembly extends is preferably a transverse slot extending to the edge of the flange, as aforementioned, so that the weighing assembly may be removed by means of this slot.

Various further and more specific objects, features and advantages of the invention will appear from the description taken in connection with the accompanying drawings which form a part of this specification and illustrate by way of example one embodiment of such invention. The invention consists in such novel features and combinations of parts as may be shown and described in connection with the apparatus herein disclosed.

In the drawings, Fig. 1 is a plan view showing a truck-weighing apparatus embodying one form of the invention;

Fig. 2 is an elevation view taken substantially along line 2—2 of Fig. 1;

Fig. 3 is a fragmentary plan view showing a portion of the apparatus in greater detail than is shown in Fig. 1;

Fig. 4 is a vertical sectional view on a relatively enlarged scale taken substantially along line 4—4 of Fig. 1;

Fig. 5 is a horziontal sectional view taken substantially along line 5—5 of Fig. 4;

Fig. 6 is a vertical sectional view taken substantially along line 6—6 of Fig. 1;

Fig. 7 is an elevation view showing on an enlarged scale a portion of the apparatus of Fig. 1 but in greater detail.

Figure 8:
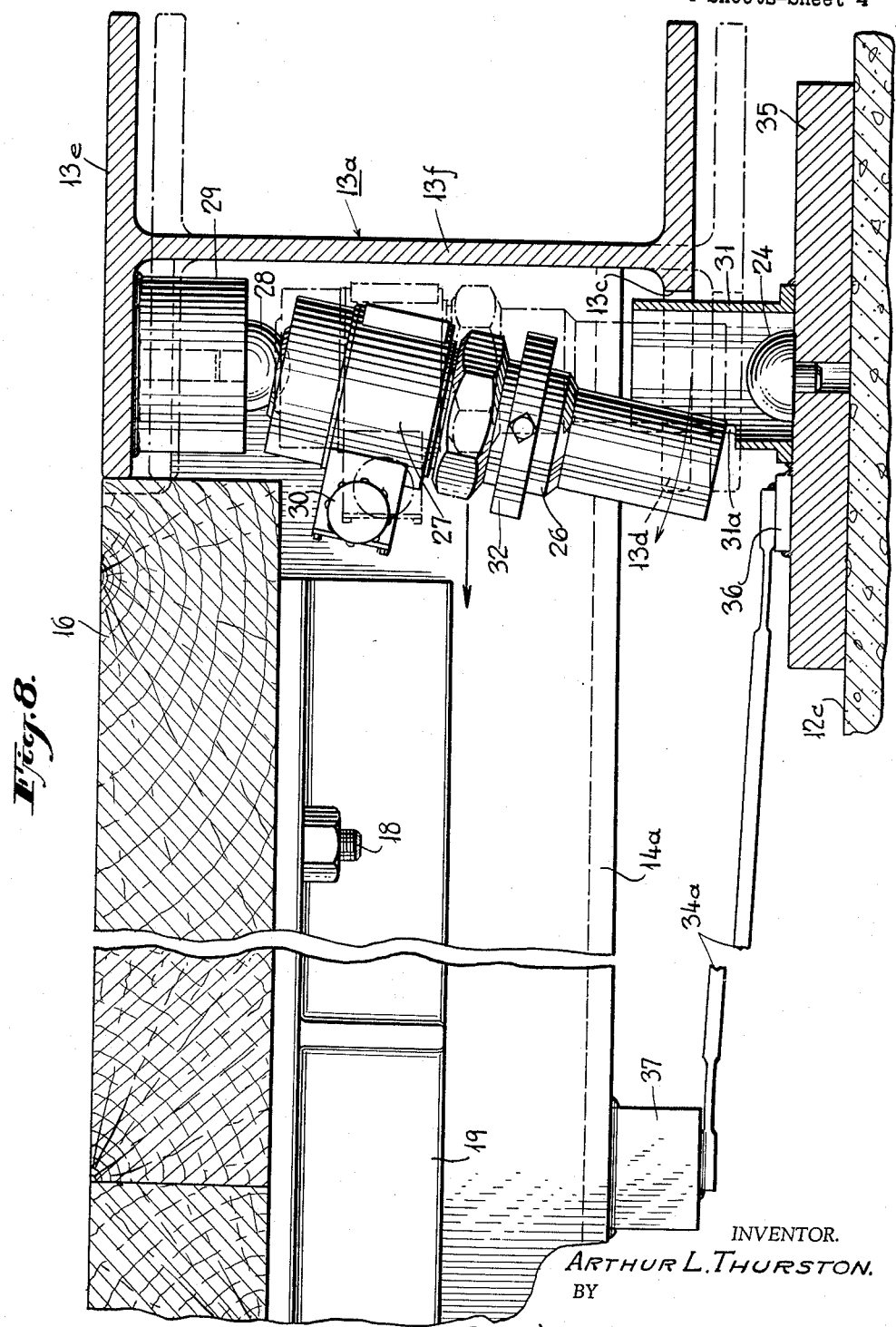
Fig. 8 is a vertical sectional view also taken substantially along line 4—4 of Fig. 1 (as in Fig. 4) and showing the position of certain parts for removing the weighing cell assembly.

As shown in Figs. 1 and 2, the apparatus includes a weighing assembly made up of three platform sections 11a, 11b and 11c. The weighing assembly is recessed in an excavation so that its top surface is level with the ground or roadway 15 in which it is set. The weighing assembly is supported by foundation members such as 12a, 12b, 12c and 12d which may, for instance, be concrete strips of suitable size and thickness. Each of the platform sections is made up of I-beams such as 13a and 13b, cross-beams such as 14a and 14b, and is covered with planks such as 16. Additional supporting members may, of course, be used if desired.

Retaining members such as 17 are fixed to the foundation members 12a and 12d at the ends of the weighing assembly in order to prevent collapse or cave in of the roadway or ground immediately adjacent to the excavation. Similar protection may be provided around the entire edge of the excavation, if desired.

Referring to Fig. 6, the planks 16 forming the top surface of the platform sections are fastened to the cross-beams, such as 14a, by means of bolts such as 18 and angle irons such as 19 which are secured to the cross-beams by suitable means such as welding. The bolts are recessed into the planks and the planks are positioned with respect to the cross-beams so that a relatively level surface free of projections is formed onto which vehicles to be weighed can be driven. The cross-beams such as 14a extend across the entire width of each platform section and are secured to the webs of the I-beams by suitable means such as welding. As shown in Fig. 4, the cross-beams such as 14a are indented at their upper ends as at 14a' in order to accommodate the upper flanges of the I-beams such as 13a. From Fig. 4 it can also be seen that angle iron 19 does not extend the entire distance to I-beam 13a. This arrangement allows clearance for removing the weighing cell assembly as shown in Fig. 8.

As shown in Figs. 5 and 7, the platform sections such as 13a and 13b are joined together by means of angle plates 21a and 21b which are permanently secured to I-beams 13a and 13b respectively, by welding. The projecting portions of angle irons 21a and 21b are then removably secured together as by bolts such as 22. In this way the weighing platform sections may be assembled into a continuous, relatively rigid platform, but may be easily disassembled and removed individually if desired.

Figs. 4 and 5 show a single weighing cell assembly 23 used in combination with other like assemblies to measure weight applied to the platform sections. A plurality of such assemblies is so located that any weight applied to the platform sections is transmitted to the weighing cell assemblies. The particular weighing cell assembly 23 is supported on a base 35 which is fixed to foundation member 12c. A lower adaptor ball 24 is provided which has a convex projecting surface conforming to the surface of a sphere which extends upwardly from base 35 and is adapted to fit a corresponding cavity in the lower end of a part of the weighing cell assembly comprising a strut member 26. Strut 26 is secured to a weighing cell proper 27 which in combination with associated means is adapted to indicate the weight applied to the weighing platform sections. Weighing cell 27 preferably includes one or more steel columns, which receive the weight applied to the weighing platform sections, and electrical strain gage means which are responsive to the resulting strains in the steel columns. A suitable electrical connection 30 may be provided for connecting electrical measuring equipment to weighing cell 27. As aforementioned a weighing cell as shown in my U.S. Patent 2,488,349 may be employed, but any other suitable weighing cell may be used. The upper end of weighing cell 27 has a cavity 27a conforming to the surface of a sphere which is adapted to receive an upper adaptor ball 28 similar to lower adaptor ball 24. Adaptor ball 28 bears against a block 29 which is secured beneath the top flange of I-beam 13a as by welding.

The means for removably securing a weighing cell assembly, such as 23, to an I-beam will now be described in connection with Figs. 4 and 5.

A generally cylindrical protective cover 31 is secured to base 35 as by welding. A lock ring 32 is provided which can be locked around cover 31 by means of a set screw 33 (Fig. 5). Cover 31 is provided with a longitudinal slot 31a on the side opposite the web of the I-beam so that strut 26 may be removed from the protective cover by moving it away from the web of the I-beam as shown in Fig. 8. The lower flange 13c of I-beam 13a is provided with a transverse slot 13d of sufficient size so that free vertical movement of the I-beam with respect to the protective cover 31 is allowed. The slot 13d in the lower flange 13c of the I-beam 13a also cooperates with the slot 31a in the protective cover in allowing the strut to swing free as shown in Fig. 8. The lower flange 13c is parallel to upper flange 13e, the two flanges being interconnected by body portion 13f.

Access to weighing cell 27 may be obtained by unbolting and removing a plank 16. In order to remove the weighing cell assembly 23, including weighing cell 27 and strut 26, the set screw 33 (Fig. 5) is then loosened so that lock ring 32 may be moved upwardly of the strut 26 to the position shown in Fig. 8. Then, if the weighing platform section is raised sufficiently so that the lower extremity of strut 26 may be disengaged from adaptor ball 24, the weighing cell assembly may be angularly shifted and removed as shown in Fig. 8. The necessary raising of the platform section may be accomplished by placing a jack between base 35 and the lower flange of I-beam 13a.

Tie rods such as 34a and 34b (Figs. 4 and 5, respectively) are provided to prevent horizontal movement of the platform sections with respect to the foundation and base elements. The axes of such tie rods are substantially perpendicular to one another thus to prevent both lengthwise and sidewise movement of the platform sections. Tie rod 34a, for example, is secured by means of a block 36 to base 35 by welding, and is likewise secured to crossbeam 14a by welding to a block 37 which in turn is permanently secured to the cross-beams as by welding.

In the form of the invention shown, in addition to the weighing cell assembly 23 there are also employed other similar cell assemblies 38–44, inclusive, as in Fig. 1. The weighing cells of such assemblies are all electrically interconnected to suitable well known summation circuit means 45 having associated therewith a weight indicator 46 which is movable with respect to a graduated weight scale 47. In assembling the weighing apparatus, the platform sections and weighing cell assemblies are first assembled in proper alignment and then the tie rods are welded in place to prevent any horizontal movement of the platform sections. The tie rods should be of suitable construction so that when they are placed substantially horizontally, as shown, they will be readily yieldable in vertical directions, but substantially unyieldable in horizontal directions.

While the invention has been described in detail with respect to a preferred embodiment, it will be understood by those skilled in the art that various changes and modifications may be made without departing from the spirit and scope of the invention and it is intended to cover all such changes and modifications in the appended claims.

I claim:

1. Weighing cell apparatus adapted for use in a weighing assembly comprising in combination: a weighing platform; beam means forming part of said platform and having upper and lower superimposed, spaced, horizontal flanges; a base member spaced below said lower flange; weighing cell means adapted to weigh loads applied to said platform; a convex downwardly facing projection secured to said upper flange above said base means and adapted to receive the upper end of said weighing cell; generally cylindrical strut means secured at its upper end to the lower end of said weighing cell; an upwardly facing convex projection secured to said base means and adapted to receive the lower end of said strut means; a generally cylindrical protective member surrounding the lower portion of said strut means, said protective member being secured at its lower end to said base member and extending upwardly through a transverse slot in said lower flange, said slot extending to the edge of said lower flange and being sufficiently large to allow free vertical movement of said lower flange with respect to said protective member, said protective member having a longitudinal slot aligned so as to cooperate with the slot in said lower flange in allowing said strut means to swing free of said lower flange and said protective member; and a lock ring adapted to be secured in locked position around the said protective member at a point above said lower flange by set screw means whereby movement of said strut means out of said protective cover is prevented by said lock ring and adapted in unlocked position to be moved upward on said strut means to a point above the top of said protective member whereby movement of said strut means out of said protective member is permitted.

2. Weighing cell apparatus adapted for use in a weighing assembly comprising in combination: a weighing platform; beam means forming part of said platform and having upper and lower superimposed, spaced, horizontal flanges; a base member spaced below said lower flange; weighing cell means adapted to weigh loads applied to said platform; a convex downwardly facing projection secured to said upper flange above said base means and adapted to receive the upper end of said weighing cell; generally cylindrical strut means secured at its upper end to the lower end of said weighing cell; an upwardly facing convex projection secured to said base means and adapted to receive the lower end of said strut means; and a generally cylindrical protective member surrounding the lower portion of said strut means, said protective member being secured at its lower end to said base member and extending upwardly through a transverse slot in said lower flange, said slot extending to the edge of said lower flange and being sufficiently large to allow free vertical movement of said lower flange with respect to said protective member, said protective member having a longitudinal slot aligned so as to cooperate with the slot in said lower flange in allowing said strut means to swing free of said lower flange and said protective member.

3. Weighing cell apparatus adapted for use in a weighing assembly comprising in combination: a weighing platform; beam means forming part of said platform and having upper and lower superimposed, spaced, horizontal flanges; a base member spaced below said lower flange; weighing cell assembly means including electrical strain gage means adapted to weigh loads applied to said platform; means for supporting the upper end of said weighing cell assembly means against the lower side of said upper flange; means for supporting the lower end of said weighing cell assembly means against said base member; a generally cylindrical protective member surrounding the lower portion of said weighing cell assembly means, said protective member being secured at its lower end to said base member and extending upwardly through a transverse slot in said lower flange, said slot extending to the edge of said lower flange and being sufficiently large to allow free vertical movement of said lower flange with respect to said protective member, said protective member having a longitudinal slot aligned so as to cooperate with the slot in said lower flange in allowing said strut means to swing free of said lower flange and said protective member; and a lock ring adapted to be secured in locked position around the said protective member at a point above said lower flange by set screw means whereby movement of said strut means out of said protective cover is prevented by said lock ring and adapted in unlocked position to be moved upward on said strut means to a point above the top of said protective member whereby movement of said strut means out of said protective member is not prevented by said lock ring.

4. Weighing cell apparatus adapted for use in a weighing assembly comprising, in combination: a weighing platform; beam means forming part of said platform and having upper and lower superimposed, spaced, horizontal flanges; a base member spaced below said lower flange; weighing cell assembly means including means responsive to loads on said platform for weighing same; means for supporting the upper end of said weighing cell assembly means against the lower side of said upper flange; said assembly extending downwardly therefrom through a transverse slot in said lower flange; means for supporting the lower end of said weighing cell assembly means against said base member; said transverse slot in said lower flange extending to the edge of said lower flange and embracing said weighing cell assembly means; said slot being sufficiently large to allow free vertical movement of said lower flange relatively to said weighing cell assembly means and to allow said weighing cell assembly means to move laterally therethrough away from said beam.

5. Weighing cell apparatus adapted for use in a weighing assembly comprising in combination, a weighing platform; beam means forming part of said platform and having upper and lower superimposed, spaced horizontal flanges; a base member spaced below said lower flange; weighing cell means adapted to weigh loads applied to said platform; means for supporting the upper end of said weighing cell means against the lower side of said upper flange; generally cylindrical strut means secured at its upper end to the lower end of said cell means; means for supporting the lower end of said strut means against said base member; and a generally cylindrical protective member surrounding the lower portion of said strut means, said protective member being secured at its lower end to said base member and extending upwardly through a transverse slot in said lower flange, said slot extending to the edge of said lower flange and being sufficiently large to allow free vertical movement of said lower flange relatively to said protective member, said protective member having a longitudinal slot aligned so as to cooperate with the slot in said lower flange in allowing said strut means to swing free of said lower flange and said protective member.

References Cited in the file of this patent

UNITED STATES PATENTS

| 2,488,349 | Thurston | Nov. 15, 1949 |
| 2,793,851 | Ruge | May 28, 1957 |
| 2,882,036 | Lyons | Apr. 14, 1959 |
| 2,896,935 | Osojnak et al. | July 28, 1959 |
| 2,901,235 | Bradley | Aug. 25, 1959 |

FOREIGN PATENTS

| 468,718 | Canada | Oct. 10, 1950 |